US008932392B2

(12) United States Patent
Hayashi (10) Patent No.: US 8,932,392 B2
(45) Date of Patent: Jan. 13, 2015

(54) WATER-BASED INK FOR INK-JET RECORDING, INK CARTRIDGE, INK-JET RECORDING APPARATUS AND INK-JET RECORDING METHOD

(71) Applicant: Chisato Hayashi, Marukame (JP)

(72) Inventor: Chisato Hayashi, Marukame (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 11 days.

(21) Appl. No.: 13/974,590

(22) Filed: Aug. 23, 2013

(65) Prior Publication Data
US 2014/0055534 A1  Feb. 27, 2014

(30) Foreign Application Priority Data

Aug. 24, 2012 (JP) .................. 2012-184878
Aug. 24, 2012 (JP) .................. 2012-184881

(51) Int. Cl.
C09D 11/02 (2014.01)
C09D 11/38 (2014.01)
B41J 2/175 (2006.01)

(52) U.S. Cl.
CPC ............. C09D 11/38 (2013.01); B41J 2/17503 (2013.01)
USPC .................. 106/31.36; 106/31.58; 106/31.68; 106/31.86

(58) Field of Classification Search
USPC ....................... 106/31.58, 31.36, 31.86, 31.68
See application file for complete search history.

(56) References Cited

U.S. PATENT DOCUMENTS

| 5,609,671 | A | 3/1997 | Nagasawa |
| 5,709,737 | A * | 1/1998 | Malhotra et al. ........... 106/31.43 |
| 5,837,045 | A | 11/1998 | Johnson et al. |
| 7,247,196 | B2 | 7/2007 | Sato et al. |
| 7,922,805 | B2 | 4/2011 | Kowalski et al. |
| 8,016,404 | B2 | 9/2011 | Kato et al. |
| 2006/0146108 | A1 | 7/2006 | Sato et al. |
| 2006/0201380 | A1 | 9/2006 | Kowalski et al. |
| 2007/0100023 | A1 | 5/2007 | Burns et al. |
| 2007/0100024 | A1 | 5/2007 | Gu et al. |
| 2008/0241398 | A1 | 10/2008 | Kato et al. |
| 2010/0168322 | A1 | 7/2010 | Ikoshi et al. |
| 2012/0075380 | A1 * | 3/2012 | Koase ........................... 347/20 |

FOREIGN PATENT DOCUMENTS

| JP | H08-003498 | A | 1/1996 |
| JP | 2000-513396 | A | 10/2000 |
| JP | 2001-329203 | A | 11/2001 |
| JP | 2006-096990 | A | 4/2006 |
| JP | 2008-524400 | A | 7/2008 |
| JP | 2008-246821 | A | 10/2008 |
| JP | 2009-515007 | A | 4/2009 |
| JP | 2010-155908 | A | 7/2010 |
| JP | 2011-225759 | A | 11/2011 |

* cited by examiner

*Primary Examiner* — Veronica F Faison
(74) *Attorney, Agent, or Firm* — Banner & Witcoff, Ltd.

(57) ABSTRACT

There is provided a water-based ink for ink-jet recording including: a colorant; water; glycerol; and at least one of raffinose and a derivative thereof in an amount ranging from more than 0% by weight to not more than 2% by weight with respect to an entire amount of the water-based ink. There is also provided a water-based ink for ink-jet recording including: a colorant; water; glycerol; diethylene glycol; and at least one of raffinose and a derivative thereof.

23 Claims, 1 Drawing Sheet

WATER-BASED INK FOR INK-JET RECORDING, INK CARTRIDGE, INK-JET RECORDING APPARATUS AND INK-JET RECORDING METHOD

CROSS REFERENCE TO RELATED APPLICATION

The present application claims priorities from Japanese Patent Application No. 2012-184878 filed on Aug. 24, 2012 and Japanese Patent Application No. 2012-184881 filed on Aug. 24, 2012 the disclosures of which are incorporated herein by reference in their entireties.

BACKGROUND OF THE INVENTION

1. Field of the Invention

The present invention relates to a water-based ink for ink-jet recording, an ink cartridge, an ink-jet recording apparatus and an ink-jet recording method.

2. Description of the Related Art

Regarding a water-based ink for ink-jet recording, it is important to suppress the increase in viscosity and solidification due to drying so as to realize stable discharge. For this purpose, a humectant (anti-drying agent) is generally used in the water-based ink for ink-jet recording. For example, there are proposed a water-based ink for ink-jet recording using glycerol as the humectant (see, for example, Japanese Patent Application Laid-open No. 2011-225759), and a water-based ink for ink-jet recording using diethylene glycol as the humectant (see, for example, Japanese Patent Application Laid-open No. 2006-96990 corresponding to United States Patent Application Publication No. US2006/0146108).

However, in the water-based ink for ink-jet recording using glycerol, the viscosity of glycerol is relatively high, and thus the effect for suppressing the increase in viscosity after the ink is dried (after drying) is not sufficient. On the other hand, in the water-based ink for ink-jet recording using diethylene glycol, although the viscosity of diethylene glycol is low, the diethylene glycol has a high volatility among the humectants, thus having such a problem that the diethylene glycol volatilizes due to drying. Therefore, any sufficient effect for suppressing the increase in viscosity after drying cannot be obtained. As described above, in both of the water-based ink for ink-jet recording using glycerol and the water-based ink for ink-jet recording using diethylene glycol, the effect for suppressing the increase in viscosity after drying is not sufficient. Accordingly, it is demanded that the increase in viscosity after drying is further suppressed in the water-based ink for ink-jet recording which uses glycerol or diethylene glycol.

SUMMARY OF THE INVENTION

In view of the above situation, an object of the present teaching is to provide a water-based ink for ink-jet recording in which the increase in viscosity after drying is further suppressed as compared with a conventional water-based ink.

According to a first aspect of the present teaching, there is provided a water-based ink for ink-jet recording, including:
 a colorant;
 water;
 glycerol; and
 at least one of raffinose and a derivative thereof in an amount ranging from more than 0% by weight to not more than 2% by weight with respect to an entire amount of the water-based ink.

According to a second aspect of the present teaching, there is provided a water-based ink for ink-jet recording, including:
 a colorant;
 water;
 glycerol;
 diethylene glycol; and
 at least one of raffinose and a derivative thereof.

According to a third aspect of the present teaching, there is provided an ink cartridge including the water-based ink for ink-jet recording of the first or second aspect.

According to a fourth aspect of the present teaching, there is provided an ink-jet recording method including:
 preparing a recording medium;
 discharging, to the recording medium, the water-based ink for ink-jet recording of the first or second aspect by an ink-jet system.

DESCRIPTION OF THE PREFERRED EMBODIMENTS

The extent of the increase in viscosity of a water-based ink after drying can be evaluated, for example, by the fluidity after evaporation (after-evaporation fluidity) and the viscosity after evaporation (after-evaporation viscosity) as indexes or barometers. In the present teaching, the term "after-evaporation fluidity" means, for example, fluidity of a water-based ink for ink-jet recording (hereinafter referred to simply as a "water-based ink" or an "ink" in some cases) when the ink is made to be evaporated inside an open vial (open container) and then the open vial is inclined. Further, the term "after-evaporation viscosity" in the present teaching means the viscosity of the water-based ink after the evaporation.

[Water-Based Ink]

An explanation will be given about water-based inks of first and second embodiments, as the water-based ink of the present teaching.

First Embodiment

An explanation will be given about a water-based ink of the first embodiment. The water-based ink of the first embodiment includes a colorant, water, and a humectant.

Although the colorant may be any one of a pigment and a dye, the colorant is preferably a pigment.

The pigment includes, for example, carbon black, an inorganic pigment, an organic pigment, and the like. The carbon black includes, for example, furnace black, lamp black, acetylene black, channel black, and the like. The inorganic pigment includes, for example, titanium oxide, inorganic pigments based on iron oxide, inorganic pigments based on carbon black, and the like. The organic pigment includes, for example, azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; aniline black daylight fluorescent pigment; and the like. Any other pigment is also usable provided that the pigment is dispersible in a water phase (aqueous phase).

Specific example of the pigments as described above include, for example, C. I. Pigment Blacks 1, 6, and 7; C. I. Pigment Yellows 1, 2, 3, 12, 13, 14, 15, 16, 17, 55, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; C. I. Pigment Greens 7 and 36; and the like.

The pigment may be a self-dispersible pigment. The self-dispersible pigment has a high self-dispersing stability as compared with a conventional pigment stabilized by a dispersing agent, with a filling (blending) amount same as that of the conventional pigment stabilized by the dispersing agent, thereby making it possible to lower the viscosity of the water-based ink for ink-jet recording. This makes it possible to increase the freedom in preparing a finally prepared ink, and thus the self-dispersible pigment is suitable for a colorant for the water-based ink for ink-jet recording. The self-dispersible pigment is dispersible in water without using any dispersing agent, for example, owing to the fact that at least one of the hydrophilic functional group and the salt thereof including, for example, carbonyl group, hydroxyl group, carboxylic acid group, sulfonic acid group (sulfonate group), phosphoric acid group (phosphate group), etc. is introduced into the surfaces of the pigment particles by the chemical bond directly or with any group intervening therebetween. It is possible to use self-dispersible pigments subjected to the treatment by any one of methods described, for example, in Japanese Patent Application Laid-open No. 8-3498 (corresponding to U.S. Pat. No. 5,609,671), Published Japanese Translation of PCT International Publication for Patent Application No. 2000-513396 (corresponding to U.S. Pat. No. 5,837,045), Published Japanese Translation of PCT International Publication for Patent Application No. 2008-524400 (corresponding to United States Patent Application Publication No. US2006/0201380), Published Japanese Translation of PCT International Publication for Patent Application No. 2009-515007 (corresponding to United States Patent Application Publication No. US2007/0100023 and United States Patent Application Publication No. US2007/0100024), etc. It is possible to use, as a material for the self-dispersible pigment, either one of the inorganic pigment and the organic pigment. Further, a pigment which is suitable for the above-described treatment includes for example carbon black such as "MA8" and "MA100" produced by Mitsubishi Chemical Corporation, and the like. As the self-dispersible pigment, it is possible, for example, to use a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; "LIOJET (trade name) WD BLACK 002C" produced by Toyo Ink Mfg. Co., Ltd.; and the like.

The solid content blending amount of the pigment (pigment solid content) with respect to the entire amount of the water-based ink is not particularly limited, and may be appropriately determined based on, for example, desired optical density or color (hue, tint), etc. The pigment solid content is, for example, 0.1% by weight to 20% by weight, is preferably 1% by weight to 10% by weight, and is more preferably 2% by weight to 8% by weight. The pigment solid content is further preferably 2% by weight to 4% by weight, in view of further making the solubility of the raffinose and the derivative thereof (raffinose derivative) be satisfactory.

The dye is not specifically limited, which is exemplified, for example, by direct dyes, acid dyes, basic dyes, and reactive dyes. Specified examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. C. I. Direct Black is exemplified, for example, by C. I. Direct Blacks 17, 19, 32, 51, 71, 108, 146, 154, and 168. C. I. Direct Blue is exemplified, for example, by C. I. Direct Blues 6, 22, 25, 71, 86, 90, 106, and 199. C. I. Direct Red is exemplified, for example, by C. I. Direct Reds 1, 4, 17, 28, 83, and 227. C. I. Direct Yellow is exemplified, for example, by C. I. Direct Yellows 12, 24, 26, 86, 98, 132, 142, and 173. C. I. Direct Orange is exemplified, for example, by C. I. Direct Oranges 34, 39, 44, 46, and 60. C. I. Direct Violet is exemplified, for example, by C. I. Direct Violets 47 and 48. C. I. Direct Brown is exemplified, for example, by C. I. Direct Brown 109. C. I. Direct Green is exemplified, for example, by C. I. Direct Green 59. C. I. Acid Black is exemplified, for example, by C. I. Acid Blacks 2, 7, 24, 26, 31, 52, 63, 112, and 118. C. I. Acid Blue is exemplified, for example, by C. I. Acid Blues 9, 22, 40, 59, 90, 93, 102, 104, 117, 120, 167, 229, and 234. C. I. Acid Red is exemplified, for example, by C. I. Acid Reds 1, 6, 32, 37, 51, 52, 80, 85, 87, 92, 94, 115, 180, 256, 289, 315, and 317. C. I. Acid Yellow is exemplified, for example, by C. I. Acid Yellows 11, 17, 23, 25, 29, 42, 61, and 71. C. I. Acid Orange is exemplified, for example, by C. I. Acid Oranges 7 and 19. C. I. Acid Violet is exemplified, for example, by C. I. Acid Violet 49. C. I. Basic Black is exemplified, for example, by C. I. Basic Black 2. C. I. Basic Blue is exemplified, for example, by C. I. Basic Blues 1, 3, 5, 7, 9, 24, 25, 26, 28, and 29. C. I. Basic Red is exemplified, for example, by C. I. Basic Reds 1, 2, 9, 12, 13, 14, and 37. C. I. Basic Violet is exemplified, for example, by C. I. Basic Violets 7, 14, and 27. C. I. Food Black is exemplified, for example, by C. I. Food Blacks 1 and 2.

The blending amount of the dye with respect to the entire amount of the water-based ink is not specifically limited, which is, for example, 0.1% by weight to 20% by weight and preferably 0.3% by weight to 10% by weight.

One type (kind) of the colorant may be used singly. Alternatively, two or more types (kinds) of the colorants may be used in combination.

The water is preferably ion-exchanged water or pure water (purified water). The blending amount of water (water ratio) with respect to the entire amount of the water-based ink is, for example, 10% by weight to 90% by weight, and is preferably 40% by weight to 80% by weight. The water ratio may be, for example, the balance of the water-based ink, excluding the other components.

As described above, the water-based ink contains glycerol as the humectant. Since the water-based ink of the first embodiment contains, as the humectant, glycerol which is highly water-retentive and hardly dried, the water-based ink has such an advantage that the water-based ink is capable of suppressing the water from being evaporated. The blending amount of glycerol with respect to the entire amount of the water-based ink is, for example, 5% by weight to 60% by weight (in a range of 5% by weight to 60% by weight). By making the blending amount of glycerol be not less than 5% by weight, the volatilization of the water-based ink is suitably suppressed. Further, by making the blending amount of glycerol be not more than 60% by weight, the increase in viscosity of the water-based ink is suitably suppressed. The blending amount of glycerol is preferably 10% by weight to 50% by weight. The blending amount of glycerol is more preferably 15% by weight to 25% by weight, in view of making the solubility of raffinose or the raffinose derivative be satisfactory. Although the humectant may include another humectant other than glycerol, it is preferable that the humectant is composed only of glycerol. Since glycerol contains hydroxyl group at a high existing ratio with respect to the molecular weight, glycerol is easily solvated in a component such as the pigment, etc., and is capable of suppressing the aggregation of the component such as the pigment, etc., even after drying. On the other hand, a substance such as triethylene glycol or dipropylene glycol having a low existing rate of hydroxyl group with respect to the molecular weight does not produce the aggregation-suppressing effect.

The another humectant is not particularly limited, and includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent (polyhydric) alcohols such as polyalkylene glycol, alkylene glycol, and trimethylol propane; 2-pyrrolidone; N-methyl-2-pyrrolidone; and 1,3-dimethyl-2-imidazolidinone. The polyalkylene glycol is not limited, and includes, for example, polyethylene glycol and polypropylene glycol. The alkylene glycol is not limited, and includes, for example, ethylene glycol, propylene glycol, butylene glycol, diethylene glycol, triethylene glycol, dipropylene glycol, tripropylene glycol, thiodiglycol, and hexylene glycol. It is allowable that only one kind of the another humectant as described above is used, or two or more kinds of the another humectants are used in combination. Among the above-described humectants, it is preferable to use polyvalent alcohols such as alkylene glycol, etc.

The water-based ink may further include a penetrant. The penetrant is not limited, and includes, for example, glycol ether. The glycol ether is not limited, and includes, for example, ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. It is allowable that only one kind of the penetrant as described above is used, or two or more kinds of the penetrants are used in combination.

The blending amount of the penetrant with respect to the entire amount of the water-based ink is, for example, 0% by weight to 20% by weight, is preferably 0.1% by weight to 15% by weight, and is more preferably 0.5% by weight to 10% by weight.

As described above, the water-based ink further contains raffinose or a raffinose derivative (at least one of raffinose and a raffinose derivative). The water-based ink to which raffinose that is one of the saccharides (sugars) or the derivative of raffinose is added is hardly dried and thus has an effect of maintaining the after-evaporation fluidity. It is considered due to such a structural property of the raffinose or the raffinose derivative that, since raffinose or the raffinose derivative is a saccharide having a plurality of hydroxyl groups inside the molecule and thus has a high moisture-retention property, as well as being a trisaccharide having saccharides which are different from each other as components thereof and thus making the molecule to be bulky, thereby preventing the component such as the pigment, etc., from being close to each other and thus preventing from aggregating to each other. On the other hand, another sugar compound such as glucose, maltose, etc., which are different from raffinose or the raffinose derivative, does not have the effect as described above. Accordingly, such an effect can be considered as being peculiar to raffinose or the raffinose derivative. Since the another sugar compound (another saccharide) different from raffinose does not exhibit any similar effect as the raffinose as described above, the water-based ink is preferably contain only raffinose or the raffinose derivative as the saccharide, and preferably does not contain the another saccharide different from raffinose in view of preventing the increase in viscosity of the water-based ink. Note that, however, this mechanism is merely a presumption, and not limiting the first embodiment in any way. The raffinose derivative is not particular limited, and is exemplified, for example, by tetrachloro raffinose, raffinose undecaacetate, raffinose undecapropanoate, etc. The blending amount of raffinose or the raffinose derivative (blending amount of at least one of raffinose and the raffinose derivative) is more than 0% by weight to not more than 2% by weight. By making the blending amount of raffinose or the raffinose derivative be not more than 2% by weight, the increase in viscosity of the water-based ink is suppressed. The blending amount of raffinose or the raffinose derivative with respect to the entire amount of the water-based ink is preferably 0.1% by weight to 2% by weight, more preferably 0.1% by weight to 1% by weight. The term "blending amount of raffinose or the raffinose derivative (blending amount of at least one of raffinose and the raffinose derivative)" means a blending amount only of raffinose in a case that the raffinose derivative is not used; a blending amount only of the raffinose derivative in a case that raffinose is not used; and a total blending amount of raffinose and the raffinose derivative in a case both of raffinose and the raffinose derivative are used.

Further, the blending amount of at least one of raffinose and the raffinose derivative with respect to the blending amount of glycerol is preferably more than 0% by weight to not more than 8% by weight, is more preferably 0.4% by weight to 8% by weight, is further more preferably 0.4% by weight to 4% by weight. By making the ratio of the blending amount of the glycerol and the blending amount of at least one of raffinose and the raffinose derivative be within the above-described range, it is possible to sufficiently suppress the increase in viscosity of the water-based ink after drying.

The water-based ink may further contain a conventionally known additive, if necessary. The additive includes, for example, surfactants, pH-adjusting agents, viscosity-adjusting agents, surface tension-adjusting agents, and fungicides. The viscosity-adjusting agents include, for example, polyvinyl alcohol, cellulose, water-soluble resin, etc.

a viscosity of the water-based ink is preferably 1 to 20 mPa·s, more preferably 1.5 to 10 mPa·s, further more preferably 2 to 5 mPa·s. When the viscosity of the water-based ink is less than 1 mPa·s, a splash (small droplets or satellites) of the water-based ink is appeared while discharging the water-based ink. When the viscosity of the water-based ink is more than 20 mPa·s, discharging amount of the water-based is decreased and an image recorded with the water-based ink is deteriorated.

The above-mentioned viscosity is a value measured with a viscometer (AR-G2 manufactured by TA Instruments) under the following condition of rotational speed: 10 times/second; and measurement temperature: 25 degrees Celsius.

The water-based ink can be prepared, for example, by mixing the colorant, water, glycerol, raffinose or a derivative thereof and optionally other additive component(s) as necessary uniformly or homogeneously with any conventionally known method, and by removing undissolved matters by a filter or the like.

Second Embodiment

An explanation will be given about a water-based ink of the second embodiment. The water-based ink of the second embodiment includes a colorant and water which are similar to those of the water-based ink of the first embodiment. The solid content blending amount of the pigment (pigment solid content), the blending amount of the dye and the blending amount of water (water ratio) with respect to the entire amount of the water-based ink are similar to those of the water-based ink of the first embodiment.

The water-based ink of the second embodiment contains glycerol and diethylene glycol as humectants. The water-based ink of the second embodiment uses glycerol and diethylene glycol in combination as the humectants, the water-based ink is advantageous as effectively utilizing the water-retaining property of glycerol and the low viscosity of diethylene glycol. The total blending amount of glycerol and diethylene glycol with respect to the entire amount of the water-based ink is, for example, 10% by weight to 60% by weight. By making the total blending amount of glycerol and diethylene glycol with respect to the entire amount of the water-based ink be not less than 10% by weight, the volatilization of the water-based ink is suitably suppressed. Further, by making the total blending amount of glycerol and diethylene glycol with respect to the entire amount of the water-based ink be not more than 60% by weight, the increase in viscosity of the water-based ink is suitably suppressed. The total blending amount of glycerol and diethylene glycol with respect to the entire amount of the water-based ink is preferably 15% by weight to 50% by weight. The total blending amount described above is further preferably 20% by weight to 25% by weight in view of making the solubility of raffinose or the raffinose derivative be satisfactory. The blending amount of glycerol with respect to the entire amount of the water-based ink is, for example, 5% by weight to 55% by weight, is preferably 10% by weight to 45% by weight, and is more preferably 15% by weight to 35% by weight. The blending amount of diethylene glycol with respect to the entire amount of the water-based ink is, for example, 5% by weight to 55% by weight, is preferably 10% by weight to 45% by weight, and is more preferably 15% by weight to 35% by weight. Further, in view of balancing between the moisture-retaining property of glycerol and the low viscosity property of diethylene glycol, the blending amount of diethylene glycol with respect to the total blending amount of glycerol and diethylene glycol is preferably 20% by weight to 60% by weight. Although the humectant may include another humectant other than glycerol and diethylene glycol, it is preferable that the humectant is composed only of glycerol and diethylene glycol. Since glycerol and diethylene glycol each contain hydroxyl group at a high existing ratio with respect to the molecular weight, glycerol and diethylene glycol are each easily solvated in a component such as the pigment, etc., and are capable of suppressing the aggregation of the component such as the pigment, etc., even after drying. On the other hand, the substance such as triethylene glycol or dipropylene glycol having a low existing rate of hydroxyl group with respect to the molecular weight does not produce the aggregation-suppressing effect.

The another humectant is not particularly limited, and is exemplified by humectants similar to those described regarding the water-based ink of the first embodiment. The water-based ink of the second embodiment may further contain a penetrant which is similar to that contained in the water-based ink of the first embodiment. The blending amount of the penetrant with respect to the entire amount of the water-based ink of the second embodiment is similar to that of the water-based ink of the first embodiment.

As described above, the water-based ink of the second embodiment further contains raffinose or a raffinose derivative (at least one of raffinose and a raffinose derivative). By containing raffinose or the raffinose derivative, the increase in viscosity is suppressed in the water-based ink. Note that in a case of using glycerol and diethylene glycol in combination as the humectant, the increase in viscosity after drying is suppressed even without using raffinose or the raffinose derivative, as compared with a case using singly glycerol or diethylene glycol, the increase in viscosity after drying can be further suppressed by containing raffinose or the raffinose derivative. As described above, since another saccharide (sugar compound) different from raffinose does not exhibit the effect similar to that exhibited by raffinose, it is preferable that the water-based ink contains raffinose or the raffinose derivative as the saccharide (sugar compound), and does not contain the another saccharide (sugar compound) different from raffinose in view of preventing the increase in viscosity of the water-based ink. The raffinose derivative is not particular limited, and is exemplified, for example, by tetrachloro raffinose, raffinose undecaacetate, raffinose undecapropanoate, etc., in a similar manner as in the first embodiment. The blending amount of raffinose or the raffinose derivative (blending amount of at least one of raffinose and the raffinose derivative) is not particularly limited, but in view of the re-dispersing property after the water-based is dried, the blending amount is preferably 0.4% by weight to 3% by weight, is more preferably 0.5% by weight to 1% by weight. The term "blending amount of raffinose or the raffinose derivative (blending amount of at least one of raffinose and the raffinose derivative)" means a blending amount only of raffinose in a case that the raffinose derivative is not used; a blending amount only of the raffinose derivative in a case that raffinose is not used; and a total blending amount of raffinose and the raffinose derivative in a case both of raffinose and the raffinose derivative are used.

Further, the blending amount of at least one of raffinose and the raffinose derivative with respect to the total blending amount of glycerol and diethylene glycol is 1.6% by weight to 12% by weight, is more preferably 2% by weight to 4% by weight. By making the ratio of the total blending amount of glycerol and diethylene glycol and the blending amount of at least one of raffinose and the raffinose derivative be within the above-described range, it is possible to sufficiently suppress the increase in viscosity of the water-based ink after drying. Further, it is further preferable to make the ratio of the total blending amount of glycerol and diethylene glycol and the blending amount of at least one of raffinose and the raffinose derivative be within the above-described range, and then to make the blending amount of diethylene glycol with respect to the total blending amount of glycerol and diethylene glycol be 20% by weight to 60% by weight. By making the ratio of the blending amount of glycerol, the ratio of the blending amount of diethylene glycol and the ratio of the blending amount of at least one of raffinose and the raffinose derivative be within these ranges, it is possible to sufficiently suppress the increase in viscosity after drying while balancing between the moisture-retaining property of glycerol and the low viscosity property of diethylene glycol.

The water-based ink of the second embodiment may further contain a conventionally known additive, if necessary, in a similar manner as in the water-based ink of the first embodiment. Further, the water-based ink of the second embodiment may be prepared by a method similar to that for preparing the water-based ink of the first embodiment.

Sine the water-based ink of the present teaching described above contains the raffinose or the derivate thereof in the predetermined blending amount, the increase in viscosity after drying is further suppressed as compared with a conventional water-based ink, even when the water-based ink of the present teaching uses glycerol. Further, since the water-based ink of the present teaching described above contains glycerol and diethylene glycol in combination as the humectant, and contains raffinose or the raffinose derivative, the increase in viscosity after drying is further suppressed as compared with the conventional water-based ink. Accordingly, in an ink-jet recording apparatus (such as a printer, etc.) using the water-based ink of the present teaching, it is possible to realize stable ink discharge from an ink-jet head. Further, the water-based ink of the present teaching hardly causes, in the ink-jet recording apparatus, any clogging of nozzle, and even if clogging of nozzle is occurred in the ink-jet recording apparatus, it is possible to quickly solve the clogging of nozzle by, for example, a cleaning operation of the ink-jet recording apparatus.

[Ink Cartridge]

Next, an explanation will be given about an ink cartridge of the present teaching. The ink cartridge of the present teaching is characterized by being an ink cartridge containing an water-based ink for ink-jet recording; wherein the water-based ink is the water-based ink for ink-jet recording of the present teaching. For example, any conventionally known main body (body) of an ink cartridge can be used for the main body of the ink cartridge of the present teaching.

[Ink-Jet Recording Apparatus and Ink-Jet Recording Method]

Next, explanation will be given about an ink-jet recording apparatus and an ink-jet recording method of the present teaching.

The ink-jet recording apparatus of the present teaching is an ink-jet recording apparatus characterized by including: an ink accommodating section which accommodates an ink therein; and an ink discharge mechanism which discharges the ink accommodated in the ink accommodating section; wherein the ink accommodated in the ink accommodating section is the water-based ink of the present teaching.

The ink-jet recording method of the present teaching is an ink-jet recording method characterized by including: performing recording on a recording medium by discharging, to the recording medium, a water-based ink by an ink-jet system; and using the water-based ink for ink-jet recording of the present teaching, as the water-based ink.

The ink-jet recording method of the present teaching can be practiced, for example, by using the ink-jet recording apparatus of the present teaching. The recording includes printing a letter (text), printing an image, printing, etc.

Figure 1:
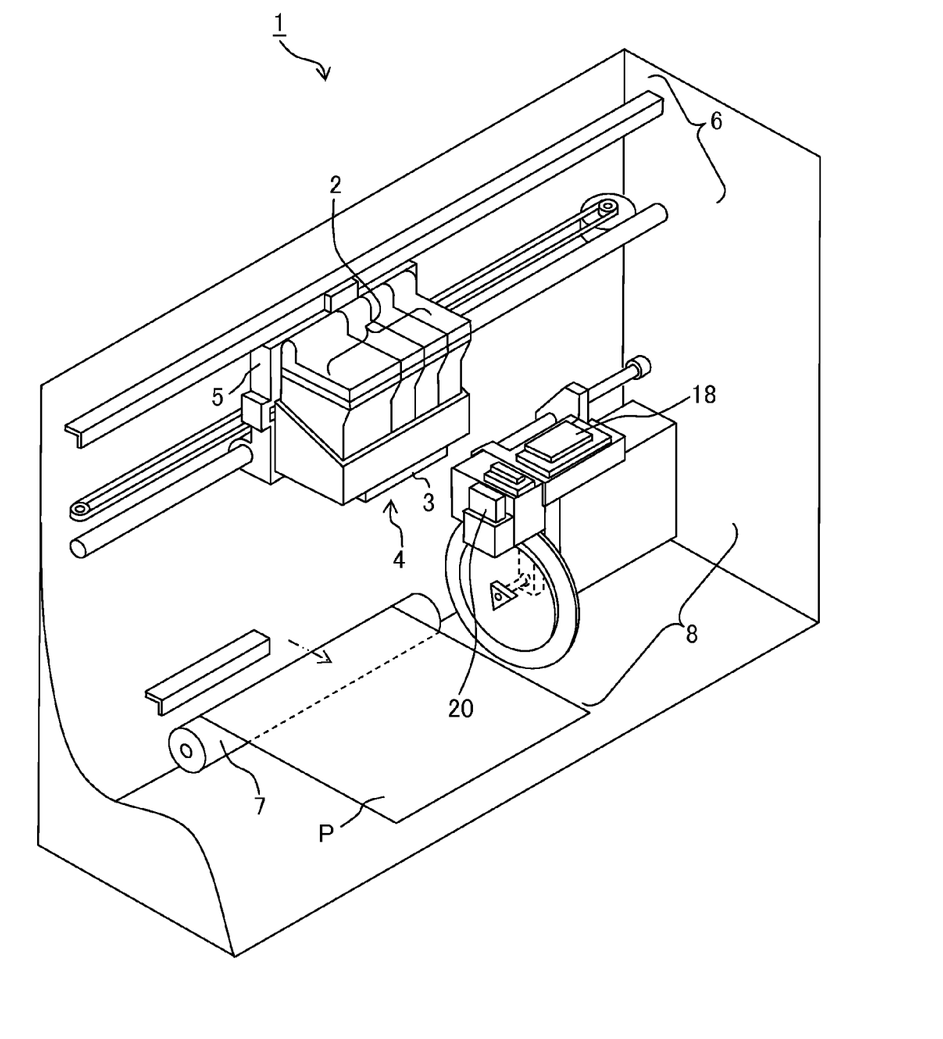
FIG. 1 is a schematic perspective view showing an example of configuration of an ink-jet recording apparatus of the present teaching.

FIG. 1 is a schematic perspective view of construction of an example of an ink-jet recording apparatus of the present teaching. As shown in FIG. 1, an ink-jet recording apparatus 1 of the present teaching includes four ink cartridges 2, an ink discharge mechanism (ink-jet head) 3, a head unit 4, a carriage 5, a driving unit 6, a platen roller 7 and a purge device 8 as main constitutive components or parts.

The four ink cartridges 2 contain four colors of water-based inks, respectively, the four colors being yellow, magenta, cyan and black. For example, the water-based black ink is the water-based ink for ink-jet recording of the present teaching. It is allowable to use general water-based inks as the other water-based inks which are different from the water-based black ink. The ink-jet head 3 disposed on the head unit 4 performs recording on a recording medium (for example, recording paper or recording paper sheet) P. The four ink cartridges 2 and the heat unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the ink-jet head 3. As the purge device 8, it is possible to use, for example, a conventionally known purge device (for example, see Japanese Patent Application laid-open No. 2008-246821 corresponding to United States Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of the recording, so as to prevent the water-based inks from drying.

In the ink-jet recording apparatus 1 of the present embodiment, the four ink cartridges 2 are provided, together with the head unit 4, on one carriage 5. However, the present teaching is not limited to this. In the ink-jet recording apparatus, the respective four cartridges 2 may be provided on a carriage which is different (separate) from the carriage on which the head unit 4 is provided. Alternatively, the respective four cartridges 2 may be arranged and fixed inside the ink-jet recording apparatus, rather than being provided on the carriage 5. In such aspects, for example, each of the four cartridges 2 and the head unit 4 which is provided on the carriage 5 are connected with a tube, etc., and the water-based ink are supplied from the four cartridges 2, respectively, to the head unit 4 via the tubes.

Ink-jet recording using the ink-jet recording apparatus 1 is performed, for example, in the following manner. Namely, at first, a recording paper P is supplied or fed, for example, from a paper feeding cassette or sheet feeding cassette (not shown) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based ink(s) discharged or jetted from the ink-jet head 3. Since the increase in viscosity after drying is further suppressed in the water-based ink of the present teaching as compared with a conventional water-based ink, it is possible to realize stable ink discharge from the ink-jet head 3. The recording paper P after the recording is discharged from the ink-jet recording apparatus 1. In FIG. 1, the paper feeding mechanism and paper discharge mechanism for the recording paper P are omitted in the drawing.

In the apparatus shown in FIG. 1, an ink-jet head of serial type (serial type ink-jet head) is adopted. However, the present teaching is not limited to this. The ink-jet recording apparatus may be an apparatus adopting an ink-jet head of line type (line type ink-jet head).

According to the present teaching, there is provided an anti-thickening agent (viscosity retarding agent) for suppressing increase in viscosity in a water-based ink for ink-jet recording containing a colorant, water and glycerol, the anti-thickening agent characterized by containing raffinose or a derivative thereof, wherein the raffinose or the derivative thereof is blended to the water-based ink so that a blending amount of the raffinose or the derivative thereof with respect to an entire amount of the water-based ink is more than 0% by weight to not more than 2% by weight.

Further, according to the present teaching, there is provided an anti-thickening agent (viscosity retarding agent) for suppressing increase in viscosity in a water-based ink for ink-jet recording containing a colorant, water, glycerol and diethylene glycol, the anti-thickening agent characterized by containing raffinose or a derivative thereof.

Furthermore, according to the present teaching, there is provided an anti-thickening method (viscosity retarding method) for suppressing increase in viscosity in a water-based ink for ink-jet recording containing a colorant, water and glycerol, the anti-thickening method characterized by including a blending step of blending an anti-thickening agent (viscosity retarding agent) to the water-based ink; wherein the anti-thickening agent includes raffinose or a derivative thereof, and in the blending step, the raffinose or the derivative thereof is blended to the water-based ink so that a blending amount of the raffinose or the derivative thereof with respect to an entire amount of the water-based ink is more than 0% by weight to not more than 2% by weight.

Moreover, according to the present teaching, there is provided an anti-thickening method (viscosity retarding method) for suppressing increase in viscosity in a water-based ink for ink-jet recording containing a colorant, water, glycerol and diethylene glycol, the anti-thickening method characterized by including a blending step of blending an anti-thickening agent (viscosity retarding agent) to the water-based ink; wherein the anti-thickening agent includes raffinose or a derivative thereof.

In the anti-thickening agent and the anti-thickening method, the kinds, blending amounts and aspects, etc. of the respective components such as the coloring agent, etc., may be similar as those of the water-based ink for ink-jet recording of the present teaching.

EXAMPLES

Next, examples of the present teaching will be explained together with comparative examples. Note that the present teaching is not limited and is not restricted to the examples and the comparative examples which will be described below.

Examples 1 (1-1 to 1-4) to 3; and Comparative Examples 1 (1-1 to 1-7) to 3

Components except for a water dispersion of self-dispersible carbon black (self-dispersible carbon black water dispersion), which were included in Composition of Water-based Ink (TABLE 1) as indicated below, were mixed uniformly or homogeneously; and thus an ink solvent was obtained. Subsequently, the ink solvent was added to the self-dispersible carbon black water dispersion, followed by being mixed uniformly. After that, the obtained mixture was filtrated through a cellulose acetate membrane filter (pore size 3.00 μm) produced by Toyo Roshi Kaisha, Ltd., and thus water-based inks for ink-jet recording of Examples 1 (1-1 to 1-4) to 3 and Comparative Examples 1 (1-1 to 1-7) to 3 were obtained.

With respect to the water-based inks of Examples 1-1 to 3 and Comparative Examples 1-1 to 3, (a) after-evaporation fluidity evaluation, and (b) after-evaporation viscosity measurement were performed by the following methods.

(a) After-Evaporation Fluidity Evaluation 5 g of the water-based ink of each of Examples 1-1 to 3 and Comparative Examples 1-1 to 3 was poured into a open vial (opening size (diameter) 20.2 mm). The open vial was stored in a thermostatic bath for 5 days at a temperature of 60 degrees Celsius and a relative humidity of 40%. After the storage, the state of the water-based ink in the open vial was visually observed, and evaluations were made for the after-evaporation fluidity based on the following evaluation criterion.

<Evaluation Criterion of after-Evaporation Fluidity>

A: Fluidity was confirmed (the water-based ink was moved when the open vial was inclined).

B: Fluidity was confirmed when the open vial was applied with impact.

C: Fluidity was not confirmed when the open vial was applied with impact.

(b) Measurement of after-Evaporation Viscosity

The viscosity of the water-based ink of each of Examples 1-1 to 3 and Comparative Examples 1-1 to 3, after being stored inside the open vial and subjected to the after-evaporation fluidity evaluation, was measured with a viscometer (AR-G2 manufactured by TA Instruments) under the following condition of rotational speed: 10 times/second; and measurement temperature: 25 degrees Celsius. Note that the measurement of after-evaporation viscosity was performed for water-based inks, among the water-based inks of Examples 1-1 to 3 and Comparative Examples 1-1 to 3, in each of which the result of after-evaporation fluidity evaluation was "A" or "B".

The water-based ink composition of the water-based ink of each of Examples 1-1 to 3 and Comparative Examples 1-1 to 3 and the results of evaluation and measurement therefor are shown in TABLE 1. Further, regarding each of Examples 1-1 to 1-4 and Comparative Example 1-2, the "viscosity change rate after evaporation" thereof is shown in TABLE 1, with Comparative Example 1-1 as the reference therefor. Similarly, regarding each of Examples 2 and 3, the "viscosity change rate after evaporation" thereof is shown in TABLE 1 with Comparative Examples 2 and 3 as the reference therefor.

TABLE 1

| | | EXAMPLES | | | | | |
|---|---|---|---|---|---|---|---|
| | | EX. 1-1 | EX. 1-2 | EX. 1-3 | EX. 1-4 | EX. 2 | EX. 3 |
| Composition of Water-based Ink (% by weight) | CAB-O-JET (trade name) 200 (*1) | — | — | — | — | 20.0 (4.0) | — |
| | CAB-O-JET (trade name) 300 (*2) | 26.7 (4.0) | 26.7 (4.0) | 26.7 (4.0) | 26.7 (4.0) | — | — |
| | Self-dispersible carbon black modified by phosphate group (*3) | — | — | — | — | — | 4.0 |
| | Glycerol | 25.0 | 25.0 | 25.0 | 25.0 | 25.0 | 25.0 |
| | Raffinose | 0.05 | 0.1 | 1.0 | 2.0 | 1.0 | 1.0 |
| | Glucose | — | — | — | — | — | — |
| | Maltose | — | — | — | — | — | — |
| | Maltotoriose | — | — | — | — | — | — |
| | Melezitose | — | — | — | — | — | — |
| | Dipropylene glycol-n-propyl ether | 2.0 | 2.0 | 2.0 | 2.0 | 2.0 | 2.0 |
| | OLFINE (trade name) E1010 (*4) | 0.2 | 0.2 | 0.2 | 0.2 | 0.2 | 0.2 |
| | Water | balance | balance | balance | balance | balance | balance |
| Measurement and Evaluation | Fluidity after evaporation | A | A | A | A | A | A |
| | Viscosity after evaporation (mPa·s) | 309 | 290 | 302 | 366 | 748 | 339 |
| | Viscosity change rate after evaporation | 0.76 | 0.71 | 0.74 | 0.89 | 0.32 | 0.86 |

| | | COMPARATIVE EXAMPLES | | | | | | | | |
|---|---|---|---|---|---|---|---|---|---|---|
| | | COM. EX. 1-1 | COM. EX. 1-2 | COM. EX. 1-3 | COM. EX. 1-4 | COM. EX. 1-5 | COM. EX. 1-6 | COM. EX. 1-7 | COM. EX. 2 | COM. EX. 3 |
| Composition of Water-based Ink (% by weight) | CAB-O-JET (trade name) 200 (*1) | — | — | — | — | — | — | — | 20.0 (4.0) | — |
| | CAB-O-JET (trade name) 300 (*2) | 26.7 (4.0) | 26.7 (4.0) | 26.7 (4.0) | 26.7 (4.0) | 26.7 (4.0) | 26.7 (4.0) | 26.7 (4.0) | — | — |
| | Self-dispersible carbon black modified by phosphate group (*3) | — | — | — | — | — | — | — | — | 4.0 |
| | Glycerol | 25.0 | 25.0 | 25.0 | 25.0 | — | 25.0 | 25.0 | 25.0 | 25.0 |
| | Raffinose | — | 2.1 | — | — | 15.0 | — | — | — | — |
| | Glucose | — | — | 1.0 | — | — | — | — | — | — |
| | Maltose | — | — | — | 1.0 | — | — | — | — | — |
| | Maltotoriose | — | — | — | — | — | 1.0 | — | — | — |
| | Melezitose | — | — | — | — | — | — | 1.0 | — | — |
| | Dipropylene glycol-n-propyl ether | 2.0 | 2.0 | 2.0 | 2.0 | 2.0 | 2.0 | 2.0 | 2.0 | 2.0 |
| | OLFINE (trade name) E1010 (*4) | 0.2 | 0.2 | 0.2 | 0.2 | 0.2 | 0.2 | 0.2 | 0.2 | 0.2 |
| | Water | balance | balance | balance | balance | balance | balance | balance | balance | balance |
| Measurement and Evaluation | Fluidity after evaporation | A | A | C | C | C | B | A | B | A |
| | Viscosity after evaporation (mPa·s) | 409 | 472 | — | — | — | 1130 | 527 | 2330 | 392 |
| | Viscosity change rate after evaporation | — | 1.15 | — | — | — | 2.76 | 1.29 | — | — |

(*1): Self-dispersible carbon black modified by sulfonic acid group; produced by Cabot Specialty Chemicals, Inc.; Carbon black concentration = 20% by weight; parenthesized numeral in the table indicates pigment solid content amount.
(*2): Self-dispersible carbon black modified by carboxylic acid group; produced by Cabot Specialty Chemicals, Inc.; Carbon black concentration = 15% by weight; parenthesized numeral in the table indicates pigment solid content amount.
(*3): Prepared by the method described in Published Japanese Translation of PCT International Publication for Patent Application No. 2009-515007 (corresponding to United States Patent Application Publication Nos. US2007/0100023 and US2007/0100024).
(*4): Ethylene oxide (10 mole) adduct of acetylene diol, produced by Nissin Chemical Industry Co., Ltd.

As shown in TABLE 1, in Examples 1-1 to 1-4 each using the self-dispersible carbon black modified by carboxylic acid group as the colorant, and containing raffinose or the raffinose derivative in an amount ranging from more than 0% by weight to not more than 2.0% by weight, the viscosity change rate after evaporation was less than 1 and the increase in viscosity after drying was suppressed, as compared with Comparative Example 1-1 as the reference using the same colorant as that of Examples 1-1 to 1-4 and not containing raffinose or the derivative thereof. In Examples 1-2 and 1-3, each containing raffinose or the raffinose derivative in an amount within a range of 0.1% by weight to 1.0% by weight, the viscosity change rate after evaporation was particularly low and the increase in viscosity after drying was suppressed, as compared with Comparative Example 1-1 as the reference.

On the other hand, in Comparative Example 1-2 using the same colorant as that of Examples 1-1 to 1-4 and containing 2.1% by weight of raffinose, the viscosity change rate after evaporation exceeded 1, and the viscosity was increased after drying. Further, in Comparative Examples 1-3 and 1-4, each using glucose (monosaccharide) or maltose (disaccharide) instead of using raffinose, the result of the after-evaporation fluidity evaluation was inferior. Furthermore, in Comparative Example 1-5, using only raffinose but not using glycerol, the result of the after-evaporation fluidity evaluation was also inferior. Moreover, in Comparative Examples 1-6 and 1-7, each using maltotriose (trisaccharide) or melezitose (trisaccharide) instead of using raffinose, the viscosity change rate after evaporation exceeded 1.

In Example 2 using the self-dispersible carbon black modified by sulfonic acid group as the colorant and containing raffinose or the raffinose derivative in an amount ranging from more than 0% by weight to not more than 2.0% by weight, the viscosity change rate after evaporation was less than 1 and the increase in viscosity after drying was suppressed, as compared with Comparative Example 2 as the reference using the same colorant as that of Example 2 and not containing raffinose or the derivative thereof. Similarly, in Example 3 using the self-dispersible carbon black modified by phosphate group as the colorant and containing raffinose or the raffinose derivative in an amount ranging from more than 0% by weight to not more than 2.0% by weight, the viscosity change rate after evaporation was less than 1 and the increase in viscosity after drying was suppressed, as compared with Comparative Example 3 as the reference using the same colorant as that of Example 3 and not containing raffinose or the derivative thereof.

Further, in Examples 1-1 to 1-4, the blending amount of raffinose or the raffinose derivative were each within a range of more than 0% by weight to not more than 8% by weight with respect to the blending amount of glycerol (0.2% by weight, 0.4% by weight, 4% by weight and 8% by weight, respectively). In Examples 1-1 to 1-4, the "viscosity change rate after evaporation" with Comparative Example 1-1 as the reference therefor was less than 1, and the increase in viscosity after drying was suppressed. In Examples 1-1 to 1-3 in which the blending amount of raffinose or the raffinose derivative were each within a range of 0.2% by weight to 4% by weight with respect to the blending amount of glycerol, particularly in Examples 1-2 to 1-3 in which the blending amount of raffinose or the raffinose derivative were each within a range of 0.4% by weight to 4% by weight with respect to the blending amount of glycerol, the "Viscosity change rate after evaporation" with Comparative Example 1-1 as the reference therefor was particularly low, and the increase in viscosity after drying was sufficiently suppressed.

On the other hand, in Comparative Example 1-2, the blending amount of raffinose or the raffinose derivative was 8.4% by weight with respect to the blending amount of glycerol, and the "viscosity change rate after evaporation" with Comparative Example 1-1 as the reference therefor was more than 1, and the viscosity was increased after drying.

Examples 4 to 9; and Comparative Examples 4 to 6

Water-based inks for ink-jet recording of Examples 4 to 9 and Comparative Examples 4 to 6, of which ink compositions are shown in TABLE 2, were obtained by a similar method as that for obtaining the water-based ink for ink-jet recording of Example 1-1.

Regarding the water-based inks of Examples 4 to 9 and Comparative Examples 4 to 6, (a) after-evaporation fluidity evaluation, and (b) after-evaporation viscosity measurement were performed by a method similar to the method for Example 1-1.

TABLE 2 shows the water-based ink compositions and results of evaluation and measurement of the water-based inks of Examples 4 to 9 and Comparative Examples 4 to 6. Further, the ink compositions and results of evaluation and measurement of the water-based inks of Comparative Examples 1-1 and 1-5 are also shown in TABLE 2. Furthermore, with respect to Examples 4 to 9, TABLE 2 also shows "viscosity change rate after evaporation" with Comparative Example 1-1 as the reference therefor, and the "viscosity change rate after evaporation" with Comparative Example 4 as the reference therefor.

TABLE 2

| | | EXAMPLES | | | | | |
|---|---|---|---|---|---|---|---|
| | | EX. 4 | EX. 5 | EX. 6 | EX. 7 | EX. 8 | EX. 9 |
| Composition of Water-based Ink (% by weight) | CAB-O-JET (trade name) 300 (*1) | 26.7 (4.0) | 26.7 (4.0) | 26.7 (4.0) | 26.7 (4.0) | 26.7 (4.0) | 26.7 (4.0) |
| | Glycerol | 15.0 | 15.0 | 10.0 | 10.0 | 10.0 | 20.0 |
| | Diethylene glycol | 10.0 | 10.0 | 15.0 | 15.0 | 15.0 | 5.0 |
| | Raffinose | 1.0 | 1.1 | 0.4 | 0.5 | 3.0 | 1.0 |
| | Glucose | — | — | — | — | — | — |
| | Maltose | — | — | — | — | — | — |
| | Dipropylene glycol-n-propyl ether | 2.0 | 2.0 | 2.0 | 2.0 | 2.0 | 2.0 |
| | OLFINE (trade name) E1010 (*2) | 0.2 | 0.2 | 0.2 | 0.2 | 0.2 | 0.2 |
| | Water | balance | balance | balance | balance | balance | balance |
| Measurement and Evaluation | Fluidity after evaporation | A | A | A | A | A | A |
| | Viscosity after evaporation (mPa·s) | 149 | 252 | 141 | 99 | 180 | 231 |
| | Viscosity change rate after evaporation | | | | | | |
| | Reference: COM. EX. 1-1 | 0.36 | 0.62 | 0.37 | 0.24 | 0.44 | 0.56 |
| | Reference: COM. EX. 4 | 0.24 | 0.41 | 0.23 | 0.16 | 0.29 | 0.37 |

| | | COMPARATIVE EXAMPLES | | | | |
|---|---|---|---|---|---|---|
| | | COM. EX. 1-1 | COM. EX. 4 | COM. EX. 5 | COM. EX. 6 | COM. EX. 1-5 |
| Composition of Water-based Ink (% by weight) | CAB-O-JET (trade name) 300 (*1) | 26.7 (4.0) | 26.7 (4.0) | 26.7 (4.0) | 26.7 (4.0) | 26.7 (4.0) |
| | Glycerol | 25.0 | — | 10.0 | 15.0 | — |
| | Diethylene glycol | — | 25.0 | 15.0 | 10.0 | — |
| | Raffinose | — | — | — | — | 15.0 |
| | Glucose | — | — | 1.0 | — | — |
| | Maltose | — | — | — | 1.0 | — |
| | Dipropylene glycol-n-propyl ether | 2.0 | 2.0 | 2.0 | 2.0 | 2.0 |
| | OLFINE (trade name) E1010 (*2) | 0.2 | 0.2 | 0.2 | 0.2 | 0.2 |
| | Water | balance | balance | balance | balance | balance |

TABLE 2-continued

| Measurement and Evaluation | Fluidity after evaporation | A | B | C | C | C |
|---|---|---|---|---|---|---|
| | Viscosity after evaporation (mPa · s) | 409 | 622 | — | — | — |
| | Viscosity change rate after evaporation | | | | | |
| | Reference: COM. EX. 1-1 | — | — | — | — | — |
| | Reference: COM. EX. 4 | — | — | — | — | — |

(*1): Self-dispersible carbon black modified by carboxylic acid group; produced by Cabot Specialty Chemicals, Inc.; Carbon black concentration = 15% by weight; parenthesized numeral in the table indicates pigment solid content amount.
(*2): Ethylene oxide (10 mole) adduct of acetylene diol, produced by Nissin Chemical Industry Co., Ltd.

As shown in TABLE 2, in each of Examples 4 to 9, the viscosity change rate after evaporation was significantly lower than 1, as compared with Comparative Example 1-1 using only glycerol as the humectant and not containing raffinose or the raffinose derivative and as compared with Comparative Example 4 using only diethylene glycol as the humectant and not containing raffinose or the raffinose derivative, as the references therefor; and the increase in viscosity after drying was suppressed in each of Examples 4 to 9. Note that in each of Examples 4 to 9, the blending amount of raffinose or the raffinose derivative was in a range of 0.4% by weight to 3% by weight.

On the other hand, in each of Comparative Examples 5 and 6 using glucose (monosaccharide) or maltose (disaccharide), the result of the after-evaporation fluidity evaluation was inferior. Further, in Comparative Example 1-5, using only raffinose but not using glycerol and diethylene glycol, the result of the after-evaporation fluidity evaluation was also inferior.

Note that when comparing Examples 6 to 8 in which the blending amounts of glycerol and the blending amount of diethylene glycol were same with one another, the "viscosity change rate after evaporation" was lowered in a case that the blending amount of raffinose or the raffinose derivative was increased from 0.4% by weight (Example 6) to 0.5% by weight (Example 7). However, when the blending amount of raffinose or the raffinose derivative was further increased to 3.0% by weight (Example 8), the "viscosity change rate after evaporation" was increased. Similarly, when comparing Examples 4 and 5 in which the blending amounts of glycerol and the blending amount of diethylene glycol were same with each other, the "viscosity change rate after evaporation" was increased in Example 5 in which the blending amount of raffinose or the raffinose derivative was 1.1% by weight than in Example 4 in which the blending amount of raffinose or the raffinose derivative was 1.0% by weight. From these results, it is presumed that the blending mount of raffinose or the raffinose derivative in the ink is preferably in a range of 0.5% by weight to 1.0% by weight, in view of suppressing the increase in viscosity after drying.

In Examples 4 to 9, the blending amount of raffinose or the raffinose derivative with respect to the total blending amount of glycerol and diethylene glycol were 4% by weight, 4.4% by weight, 1.6% by weight, 2% by weight, 12% by weight and 4% by weight, respectively, that were within a range of 1.6% by weight to 12% by weight. Further, in Examples 4 to 9, the blending amount of diethylene glycol with respect to the total blending amount of glycerol and diethylene glycol were 40% by weight, 40% by weight, 60% by weight, 60% by weight, 60% by weight and 20% by weight, respectively, that were within a range of 20% by weight to 60% by weight. In each of Examples 4 to 9 having such an ink composition as described above, the "viscosity change rate after evaporation" was less than 1, and the increase in viscosity after drying was suppressed.

Further, when comparing Examples 6 to 8 in which the blending amounts of glycerol and diethylene glycol were same with one another, the "viscosity change rate after evaporation" was lowered in a case that the blending amount of raffinose or the raffinose derivative was increased from 1.6% by weight (Example 6) to 2% by weight (Example 7) with respect to the total blending amount of glycerol and diethylene glycol. However, when the blending amount of raffinose or the raffinose derivative was further increased to 12% by weight (Example 8) with respect to the total blending amount of glycerol and diethylene glycol, the "viscosity change rate after evaporation" was increased. Similarly, when comparing Examples 4 and 5 in which the blending amounts of glycerol and the blending amount of diethylene glycol were same with each other, the "viscosity change rate after evaporation" was increased in Example 5 in which the blending amount of raffinose or the raffinose derivative was 4.4% by weight with respect to the total blending amount of glycerol and diethylene glycol than in Example 4 in which the blending amount of raffinose or the raffinose derivative was 4% by weight with respect to the total blending amount of glycerol and diethylene glycol. From these results, it is presumed that the blending mount of raffinose or the raffinose derivative with respect to the total blending amount of glycerol and diethylene glycol is preferably in a range of 1.6% by weight to 4% by weight, more preferably in a range of 2% by weight to 4% by weight, in view of suppressing the increase in viscosity after drying.

As described above, the increase in viscosity after drying is further suppressed in the water-based ink of the present teaching, as compared with the conventional water-based ink. The usage of the water-based ink of the present teaching is not particularly limited, and the water-based ink of the present teaching is widely applicable to a variety of kinds of ink-jet recording.

What is claimed is:

1. A water-based ink for inkjet recording, comprising:
   a colorant;
   water;
   glycerol; and
   raffinose, a derivative thereof, or both in an amount ranging from 0.05% by weight to 1% by weight with respect to an entire amount of the water-based ink.

2. The water-based ink for ink-jet recording according to claim 1, wherein the colorant is a self-dispersible pigment modified by an anionic group.

3. The water-based ink for ink-jet recording according to claim 1, wherein the water-based ink does not contain a saccharide different from the raffinose and the derivative thereof.

4. The water-based ink for ink-jet recording according to claim 1, wherein raffinose, the derivative thereof, or both is contained in an amount ranging from more than 0% by weight to not more than 8% by weight with respect to a blending amount of the glycerol.

5. The water-based ink for ink-jet recording according to claim 4, wherein raffinose, the derivative thereof, or both is contained in an amount of 0.2% by weight to 4% by weight with respect to the blending amount of the glycerol.

6. The water-based ink for ink-jet recording according to claim 5, wherein raffinose, the derivative thereof, or both is contained in an amount of 0.4% by weight to 4% by weight with respect to the blending amount of the glycerol.

7. An ink cartridge comprising the water-based ink for ink-jet recording as defined in claim 1.

8. An ink-jet recording method comprising:
preparing a recording medium; and
discharging, to the recording medium, the water-based ink for ink-jet recording as defined in claim 1.

9. A water-based ink for ink-jet recording, comprising:
a colorant;
water;
glycerol;
diethylene glycol; and
raffinose, a derivative thereof, or both in an amount of 0.05% by weight to 1% by weight with respect to the entire amount of the water-based ink.

10. The water-based ink for ink-jet recording according to claim 9, wherein raffinose, the derivative thereof, or both is contained in an amount of 0.4% by weight to 1% by weight with respect to the entire amount of the water-based ink.

11. The water-based ink for ink-jet recording according to claim 10, wherein raffinose, the derivative thereof, or both is contained in an amount of 0.5% by weight to 1% by weight with respect to the entire amount of the water-based ink.

12. The water-based ink for ink-jet recording according to claim 9, wherein the colorant is a self-dispersible pigment modified by an anionic group.

13. The water-based ink for ink-jet recording according to claim 9, wherein the water-based ink does not contain a saccharide different from the raffinose and the derivative thereof.

14. The water-based ink for ink-jet recording according to claim 9, at least one of the raffinose and the derivative thereof is contained in an amount of 1.6% by weight to 12% by weight with respect to a total blending amount of the glycerol and the diethylene glycol.

15. The water-based ink for ink-jet recording according to claim 14, wherein at least one of the raffinose and the derivative thereof is contained in an amount of 1.6% by weight to 4% by weight with respect to the total blending amount of the glycerol and the diethylene glycol.

16. The water-based ink for ink-jet recording according to claim 15, wherein at least one of the raffinose and the derivative thereof is contained in an amount of 2% by weight to 4% by weight with respect to the total blending amount of the glycerol and the diethylene glycol.

17. The water-based ink for ink-jet recording according to claim 9, wherein the diethylene glycol is contained in an amount of 20% by weight to 60% by weight with respect to a total blending amount of the glycerol and the diethylene glycol.

18. An ink cartridge comprising the water-based ink for ink-jet recording as defined in claim 9.

19. An ink-jet recording method comprising:
preparing a recording medium; and
discharging, to the recording medium, the water-based ink for ink-jet recording as defined in claim 9.

20. The water-based ink for ink-jet recording to claim 9, wherein diethylene glycol is contained in an amount of 15% by weight to 35% by weight with respect to the entire amount of the water-based ink.

21. The water-based ink for ink-jet recording according to claim 1, wherein glycerol is contained in an amount of 10% by weight to 50% by weight with respect to the entire amount of the water-based ink.

22. The water-based ink for ink-jet recording according to claim 9, wherein glycerol is contained in an amount of 10% by weight to 50% by weight with respect to the entire amount of the water-based ink.

23. The water-based ink for ink-jet recording according to claim 1, wherein after-evaporation viscosity of the water-based ink is from 309 mPa·s to 339 mPa·s.

* * * * *